(12) United States Patent
Lin et al.

(10) Patent No.: US 12,028,710 B2
(45) Date of Patent: Jul. 2, 2024

(54) STAND-ALONE NON-PUBLIC NETWORK AS SERVICE PROVIDER

(71) Applicant: MEDIATEK INC., Hsin-Chu (TW)

(72) Inventors: Yuan-Chieh Lin, Hsin-Chu (TW); Chien-Chun Huang-Fu, Hsin-Chu (TW); Chia-Lin Lai, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 262 days.

(21) Appl. No.: 17/474,886

(22) Filed: Sep. 14, 2021

(65) Prior Publication Data
US 2022/0124497 A1 Apr. 21, 2022

Related U.S. Application Data

(60) Provisional application No. 63/091,953, filed on Oct. 15, 2020.

(51) Int. Cl.
*H04W 12/08* (2021.01)
(52) U.S. Cl.
CPC .................... *H04W 12/08* (2013.01)
(58) Field of Classification Search
CPC .............................. H04W 12/069; H04W 12/08
See application file for complete search history.

(56) References Cited

U.S. PATENT DOCUMENTS

| | | | | |
|---|---|---|---|---|
| 2019/0223246 A1* | 7/2019 | Huang-Fu | | H04W 76/18 |
| 2020/0077268 A1* | 3/2020 | Seshadri | | H04W 12/08 |
| 2020/0245235 A1* | 7/2020 | Chun | | H04W 48/18 |
| 2021/0051577 A1* | 2/2021 | Won | | H04W 48/02 |
| 2021/0051578 A1* | 2/2021 | Sethi | | H04W 60/04 |
| 2021/0099968 A1* | 4/2021 | Tiwari | | H04W 60/06 |
| 2021/0211975 A1* | 7/2021 | Prabhakar | | H04W 8/06 |
| 2021/0250890 A1* | 8/2021 | Won | | H04W 48/16 |
| 2021/0258857 A1* | 8/2021 | Won | | H04W 48/18 |
| 2021/0329716 A1* | 10/2021 | Wong | | H04L 65/1016 |
| 2022/0014980 A1* | 1/2022 | Tseng | | H04W 48/12 |
| 2022/0201593 A1* | 6/2022 | Baek | | H04W 48/18 |
| 2022/0279378 A1* | 9/2022 | Kawasaki | | H04W 76/20 |

OTHER PUBLICATIONS

China Intellectual Property Office Action 202111175043.X, dated Jan. 26, 2024 (8 pages).

* cited by examiner

*Primary Examiner* — Eric W Shepperd
(74) *Attorney, Agent, or Firm* — Zheng Jin; Helen Mao; Imperium Patent Works

(57) ABSTRACT

A method of enhanced handling of a Forbidden SNPN list by a UE is proposed. When the UE registers to a first SNPN using credentials supplied by a second SNPN and receives a rejection from the network, the UE adds an entry of the first SNPN into one of the forbidden SNPN lists, and also creates an association between the first SNPN and the second SNPN. As a result, the UE is refrained from registering to the first SNPN using the credentials supplied by the second SNPN as long as the first SNPN entry remains in the forbidden SNPN list. However, the UE is allowed to register to the first SNPN using credentials supplied by other SNPNs.

16 Claims, 4 Drawing Sheets

STAND-ALONE NON-PUBLIC NETWORK AS SERVICE PROVIDER

CROSS REFERENCE TO RELATED APPLICATIONS

This application claims priority under 35 U.S.C. § 119 from U.S. Provisional Application No. 63/091,953, entitled "SNPN or PLMN as Service Provider", filed on Oct. 15, 2020, the subject matter of which is incorporated herein by reference.

TECHNICAL FIELD

The disclosed embodiments relate generally to wireless mobile communication network, and, more particularly, to method of Stand-alone Non-Public Network (SNPN) as service provider and corresponding forbidden list maintenance and usage.

BACKGROUND

A Public Land Mobile Network (PLMN) is a network established and operated by an administration or recognized operating agency (ROA) for the specific purpose of providing land mobile communication services to the public. PLMN provides communication possibilities for mobile users. A PLMN may provide service in one or a combination of frequency bands. Access to PLMN services is achieved by means of an air interface involving radio communications between mobile phones and base stations with integrated Internet Protocol (IP) network services. One PLMN may include multiple radio access networks (RAN) utilizing different radio access technologies (RAT) for accessing mobile services. A radio access network is part of a mobile communication system, which implements a radio access technology. Conceptually, RAN resides between a mobile device and provides connection with its core network (CN). Depending on the standard, mobile phones and other wireless connected devices are varyingly known as user equipment (UE), terminal equipment, mobile stations (MS), etc. Examples of different RATs include 2G GERAN ($2^{nd}$ Generation GSM Edge Radio Access Network), 3G UTRAN ($3^{rd}$ Generation Universal Mobile Telecommunications Service RAN), 4G E-UTRAN (4th Generation Evolved-UTRAN (LTE)), 5G ($5^{th}$ Generation) new radio (NR) radio access network, and other non-3GPP access RAT including WiFi.

When a mobile device is turned on, a network selection process starts, whereby candidate PLMNs are chosen, one at a time, for attempted registration. Once a UE (User Equipment) selects its desired network, it will try to attach to the network and attempts registration with the network. When a registration attempt by the UE is rejected by a network with an indication of "permanent" PLMN restriction, the PLMN identity is written to a list of "Forbidden PLMNs" stored in a data field in the SIM (Subscriber Identity Module)/USIM (Universal SIM). If a successful registration is later achieved on a PLMN in the Forbidden PLMN list, then the PLMN is deleted from the list. The Forbidden PLMN list is used to avoid unnecessary registration attempts. For example, some networks may suffer severe network errors that cannot be resolved in short term. Depending on the underlying cause of the error, it may make no sense to continue to try to attach or register to the network. In that case, continuing to try will wastefully consume UE power and use system resources when there is no chance of success.

As compared to PLMN, a non-public network (NPN) is a 5GS deployed network for non-public use. An NPN is either a Stand-alone Non-Public Network (SNPN), i.e., operated by an NPN operator and not relying on network functions provided by a PLMN; or a Public Network Integrated NPN (NPI-NPN), i.e., a non-public network deployed with the support of a PLMN. The combination of a PLMN ID and Network identifier (NID) identifies an SNPN. A UE may be enabled for SNPN. The UE selects an SNPN for which it is configured with a subscriber identifier and credentials. The UE can have several sets of subscriber identifiers, credentials, and SNPN identities. The UE maintains a list of SNPNs for which the Ni mode capability was disabled due to receipt of a reject from the network with 5GMM (5G Mobility Management) cause #27 "Ni mode not allowed". The UE maintains a list of "temporarily forbidden SNPNs" and a list of "permanently forbidden SNPNs". Each entry of those lists consists of an SNPN identity. The UE adds an SNPN to the list of "temporarily forbidden SNPNs", if a message with cause value #74 "Temporarily not authorized for this SNPN" is received by the UE in response to an request from the SNPN. The UE adds an SNPN to the list of "permanently forbidden SNPNs", if a message with cause value #75 "Permanently not authorized for this SNPN" is received by the UE in response to an request from the SNPN.

The 5G system enables an NPN to request a third-party service provider to perform NPN access network authentication of a UE based on identities and/or credentials supplied by the third-party service provider. The 5G system enables an NPN to request a PLMN to perform NPN access network authentication of a UE based on identities and/or credentials supplied by the PLMN. A 5G system enables an SNPN, i.e., First-SNPN/FrontEnd-SNPN, to be able to request another SNPN (third-party service provider), i.e., Second-SNPN/BackEnd-SNPN, to perform SNPN access network authentication of a UE based on identities and/or credentials supplied by another SNPN, i.e., Second-SNPN/BackEnd-SNPN, (the third-party service provider). When a UE registers to a First-SNPN/FrontEnd-SNPN based on identities and/or credentials supplied by a Second-SNPN/BackEnd-SNPN, and when the UE receives 5GSM (5G Session Management) error message, it is undefined whether and how the First-SNPN/FrontEnd-SNPN and/or the Second-SNPN/BackEnd-SNPN should be added to the list of "permanently forbidden SNPNs", or the list of "temporarily forbidden SNPNs", such that the network can properly inform the UE that the First-SNPN/FrontEnd-SNPN and/or the Second-SNPN/BackEnd-SNPN is permanently or temporarily not authorized.

A solution is sought.

SUMMARY

A method of enhanced handling of a Forbidden SNPN list by a UE is proposed. When the UE registers to a first SNPN using credentials supplied by a second SNPN and receives a rejection from the network, the UE adds an entry of the first SNPN into one of the forbidden SNPN lists, and also creates an association between the first SNPN and the second SNPN. As a result, the UE is refrained from registering to the first SNPN using the credentials supplied by the second SNPN as long as the first SNPN entry remains in the forbidden SNPN list. However, the UE is allowed to register to the first SNPN using credentials supplied by other SNPNs.

In one embodiment, a UE registers to a first stand-alone non-public network (SNPN) having a first SNPN ID using credentials supplied by a second SNPN having a second SNPN ID. The UE receives a notification that the UE is not authorized to access the first SNPN. The UE maintains a list of forbidden SNPNs containing one or more SNPN entries. The first SNPN ID is added to the list of forbidden SNPNs, and the second SNPN ID is associated to the first SNPN ID. The UE refrains from registering to the first SNPN using the credentials supplied by the second SNPN when the first SNPN ID remains in the list of forbidden SNPNs. The UE is allowed to register to the first SNPN using credentials supplied by another SNPN.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
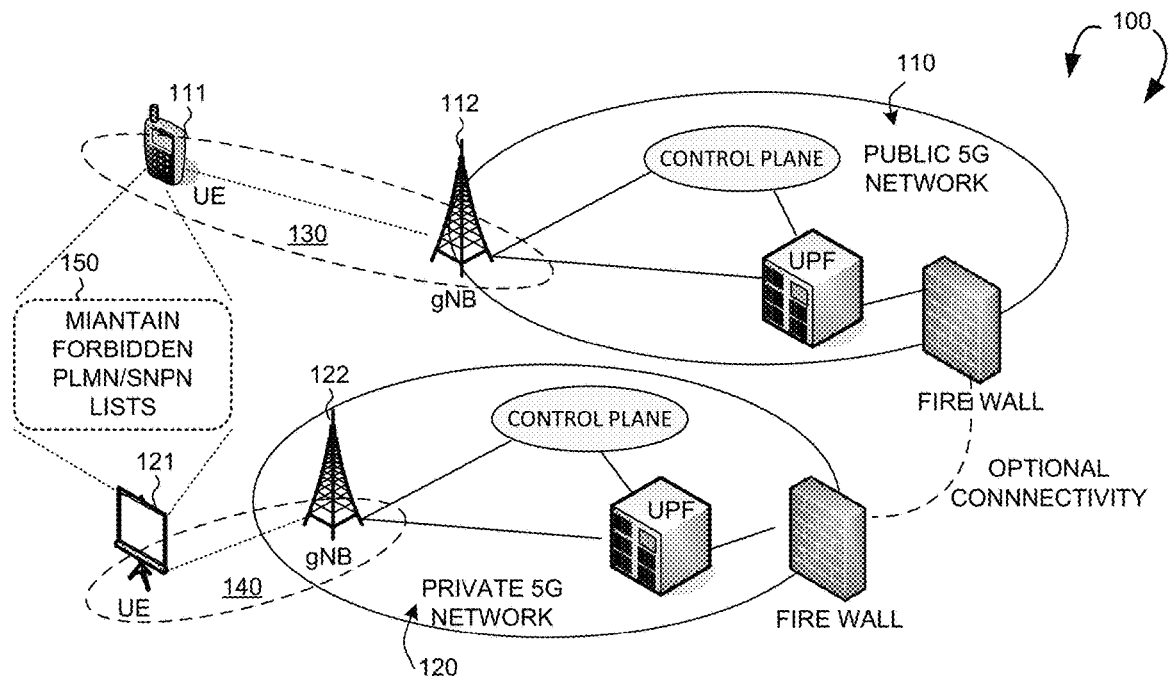
FIG. 1 schematically shows a communication system having a Public Land Mobile Network (PLMN) and a Stand-alone Non-public Network (SNPN) supporting the handling of a forbidden SNPN list in accordance with one novel aspect.

FIG. 1 schematically shows a communication system 100 having a Public Land Mobile Network (PLMN) 110 and a Stand-alone Non-public Network (SNPN) 120 supporting the handling of a forbidden SNPN list in accordance with one novel aspect. PLMN network 110 comprises control plane functionalities, user plane functionality (UPF), and application servers that provides various services by communicating with a plurality of user equipments (UEs) including UE 111. UE 111 and its serving base station gNB (Next Generation Node B) 112 belong to part of a radio access network RAN 130. RAN 130 provides radio access for UE 111 via a radio access technology (RAT), e.g. 3GPP access and non-3GPP access. A mobility management entity (MME) or an access and mobility management function (AMF) in PLMN 110 communicates with gNB 112, and other serving GW (Gateway) and PDN (Packet Data Network) GW for access and mobility management of wireless access devices in PLMN 110 (not shown).

Similarly, SNPN network 120 comprises control plane functionalities, user plane functionality (UPF), and application servers that provides various services by communicating with a plurality of user equipments (UEs) including UE 121. UE 121 and its serving base station gNB 122 belong to part of a radio access network RAN 140. RAN 140 provides radio access for UE 121 via a radio access technology (RAT), e.g. 3GPP access and non-3GPP access. A MME or AMF in SNPN 120 communicates with gNB 122, and other serving GW and PDN GW for access and mobility management of wireless access devices in SNPN 120. UE 111/121 may be equipped with a radio frequency (RF) transceiver or multiple RF transceivers for different application services via different RATs.

If registration on a PLMN is successful, UE indicates this PLMN ("the registered PLMN") and be capable of making and receiving calls on it. When a registration attempt on a PLMN is rejected by a network, the PLMN ID is written to a list of forbidden PLMNs stored in a data field on the SIM/USIM. If a successful registration is achieved on a PLMN in the forbidden PLMN list, then the PLMN ID is removed from the list. The forbidden PLMN list is to avoid unnecessary registration attempts. Similarly, if registration on an SNPN is successful, UE indicates this SNPN is authorized for access. When a registration attempt on a SNPN is rejected by a network, the SNPN ID is written to a list of forbidden SNPNs sored in UE. The SNPN ID is removed from the list when some conditions happens, for example, when a timer is expired, a successful registration is achieved on an SNPN in the forbidden SNPN list, the UE is switched off, or the "list of subscriber data" is updated. The forbidden SNPN list is to avoid unnecessary registration attempts.

The 5G system enables an SNPN to request a third-party service provider to perform SNPN access network authentication of a UE based on identities and/or credentials supplied by the third-party service provider. The 5G system enables an SNPN to request a PLMN to perform SNPN access network authentication of a UE based on identities and/or credentials supplied by the PLMN. A system enables an SNPN, i.e., First-SNPN/FrontEnd-SNPN, to be able to request another SNPN (third-party service provider), i.e., Second-SNPN/BackEnd-SNPN, to perform. SNPN access network authentication of a UE based on identities and/or credentials supplied by another SNPN, i.e., Second-SNPN/BackEnd-SNPN, (the third-party service provider). When a UE registers to a First-SNPN/FrontEnd-SNPN based on identities and/or credentials supplied by a Second-SNPN/BackEnd-SNPN, and when the UE receives 5GMM error message, it is undefined whether and how the First-SNPN/FrontEnd-SNPN and/or the Second-SNPN/BackEnd-SNPN should be added to the list of "forbidden. SNPNs", such that the network can properly inform the UE that the First-SNPN/FrontEnd-SNPN and/or the Second-SNPN/BackEnd-SNPN is not authorized.

In accordance with one novel aspect, a method of enhanced handling of a Forbidden SNPN list is proposed. A UE is configured with a "list of subscriber data" containing zero or more entries. Each entry of the "list of subscriber data" consists of: a) a subscriber identifier; b) credentials; and c) an SNPN identity of the subscribed SNPN. The UE also maintains a list of "temporarily forbidden SNPNs" and a list of "permanently forbidden SNPNs" for 3GPP access, as well as a list of "temporarily forbidden SNPNs" and a list of "permanently forbidden SNPNs" for non-3GPP access (150). Each entry of those lists consists of an SNPN identity. When the UE registers to a first SNPN using credentials supplied by a second SNPN and receives a rejection from the network, the UE adds an entry of the first SNPN into one of the forbidden SNPN lists, and creates an association between the first SNPN and the second SNPN. As a result, the UE is refrained from registering to the first SNPN using the credentials of the second SNPN as long as the first SNPN entry remains in the forbidden SNPN list. However, the UE is allowed to register to the first SNPN using credentials supplied by other SNPNs.

Figure 2:
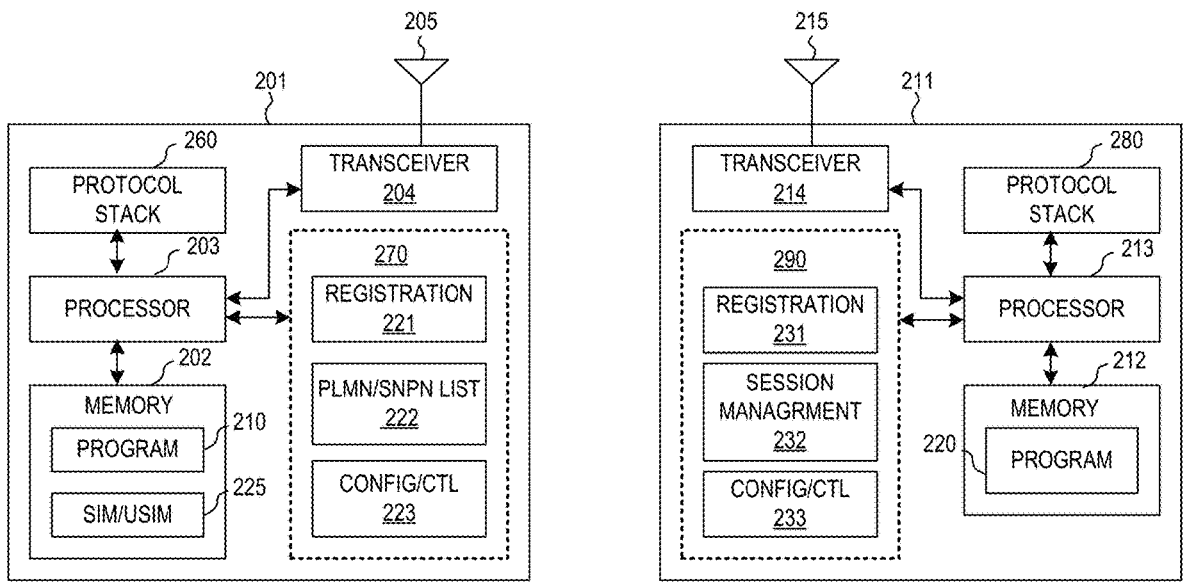
FIG. 2 illustrates simplified block diagrams of a user equipment and a network entity in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. Registration circuit 231 handles registration and mobility procedure. Session management circuit 232 handles session management functionalities. Configuration and control circuit 233 provides different parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE201 also comprises a set of functional modules and control circuits to carry out functional tasks of UE201. Protocol stacks 280 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise registration circuit 221 that performs registration and mobility procedure with the network, a PLMN/SNPN list maintenance circuit 222 that handles the adding, removing, and resetting of one or more forbidden PLMN/SNPN lists in SIM/USIM and/or in UE memory, a config and control circuit 223 that handles configuration and control parameters. Note that the network selection and registration related information, such as HPLMN (Home Public Land Mobile Network), Operator Controlled PLMN/SNPN Selector list, User Controlled PLMN/SNPN Selector list, and Forbidden PLMN/SNPN list, may be stored in SIM/USIM 225 and/or in UE memory.

Figure 3:
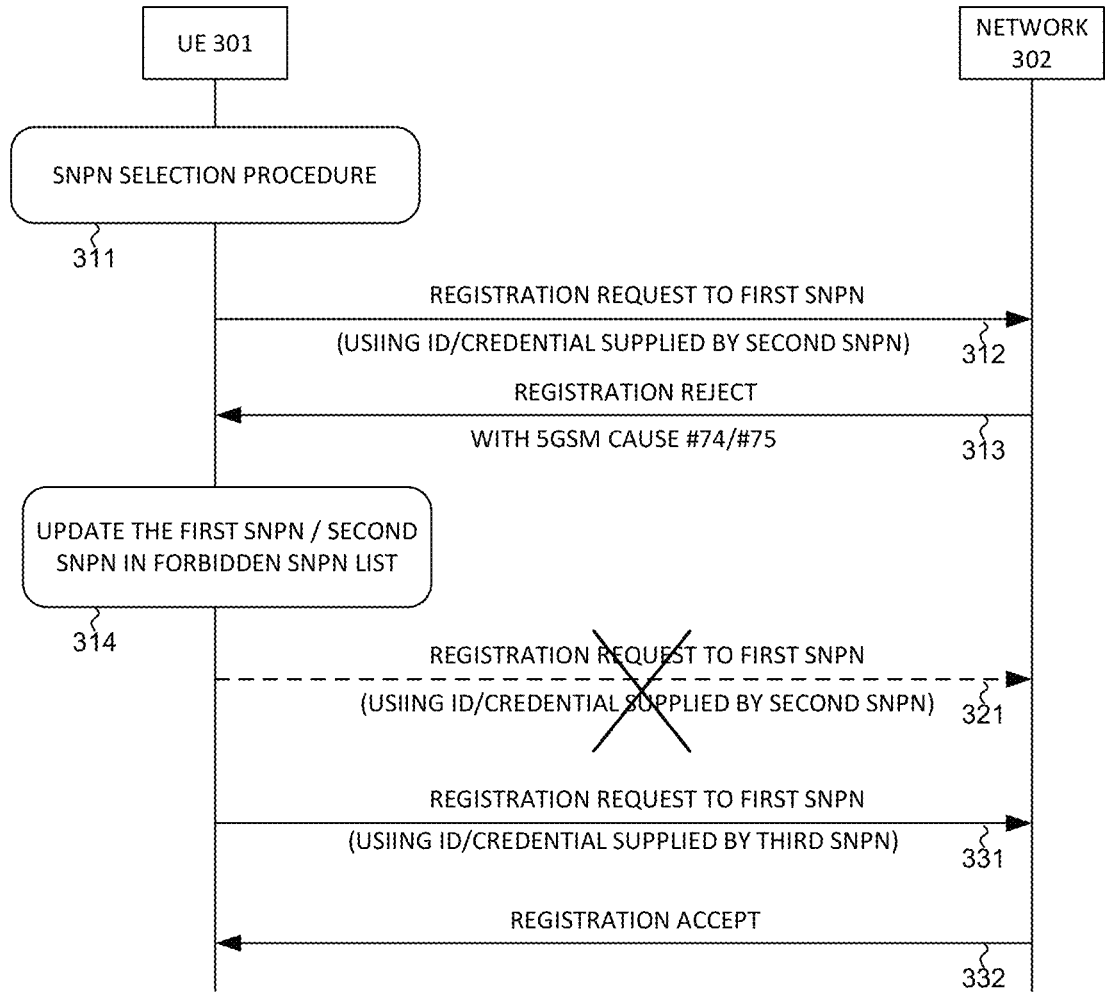
FIG. 3 illustrates an SNPN selection and registration procedure where a UE registers to a first SNPN based on identities and/or credentials supplied by a second SNPN.

FIG. 3 illustrates an SNPN selection and registration procedure where a UE registers to a first SNPN based on identities and/or credentials supplied by a second SNPN. In step 311, UE 301 selects an SNPN according to an SNPN selection procedure. For example, if there is at least one entry in the "list of subscriber data", there is zero or more entries in the "list of subscriber data", the UE has a USIM with a PLMN subscription and the ME is provisioned with the SNPN selection parameters associated with the PLMN subscription, then the UE selects one entry in the "list of subscriber data", if any, or the PLMN subscription, if any, to be used for SNPN selection and registration. In step 312, UE 301 sends a registration request to the selected SNPN, which is a first-SNPN (FrontEnd-SNPN). The UE uses credentials supplied by a second-SNPN (BackEnd-SNPN) for the registration. In step 313, upon verifying the registration credentials, the network rejects the registration request. The network 302 and sends a registration reject message to the UE 301, with a 5GMM cause value of #74 or #75, indicating that the UE 301 is permanently or temporality not authorized for this selected first-SNPN/FrontEnd-SNPN using credentials supplied by the second-SNPN/BackEnd-SNPN.

Under existing art, when a UE registers to a First-SNPN/FrontEnd-SNPN based on identities and/or credentials supplied by a Second-SNPN/BackEnd-SNPN, and when the UE receives 5GMM error message, it is undefined whether and how the First-SNPN/FrontEnd-SNPN and/or the Second-SNPN/BackEnd-SNPN should be added to the list of "forbidden SNPNs", such that the network can inform the UE that the First-SNPN/FrontEnd-SNPN is not authorized using credentials supplied by the Second-SNPN/BackEnd-SNPN. In one novel aspect, upon receiving the 5GMM cause, in step 314, UE 301 updates such information in the forbidden SNPN list. For example, UE 301 adds the first SNPN as a new entry to the forbidden. SNPN list, if not already exist in the forbidden SNPN list. In addition, the UE creates an association between the first SNPN and the second SNPN that supplies the credentials for the registration. In one example, the second SNPN is included in the same entry of the first. SNPN in the forbidden SNPN list. In another example, the second SNPN is associated to the first SNPN without being explicitly added to the forbidden SNPN list. Instead, the entry of the "list of subscriber data." for the second SNPN is associated with the forbidden. SNPN list to which the first SNPN is added.

Upon properly updating the forbidden SNPN list and/or the list of subscriber data, UE 301 refrains from registering to the first SNPN using the credentials supplied by the second SNPN, as long as the first SNPN entry remains in the forbidden SNPN list (e.g., in step 321). However, UE 301 is allowed to register to the first SNPN using credentials of another SNPN. For example, in step 331, UE 301 sends a registration request message to the first SNPN, using credentials supplied by a third SNPN. In step 332, UE 301 receives a registration accept message from the network and successfully completes the registration process.

Figure 4:
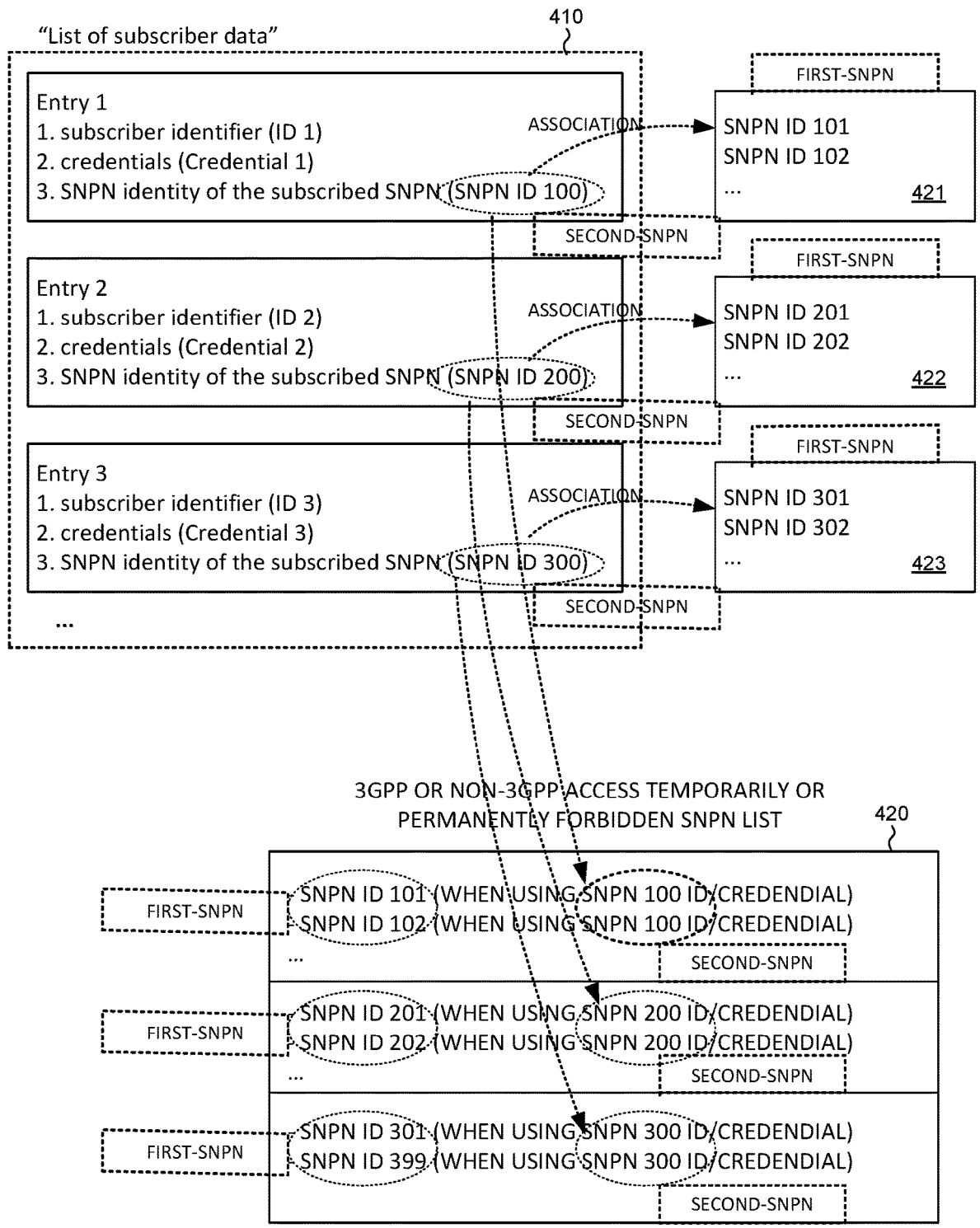
FIG. 4 illustrates one example of a list of subscriber data and a permanently or temporarily forbidden SNPN list in accordance with one novel aspect.
Figure 5:
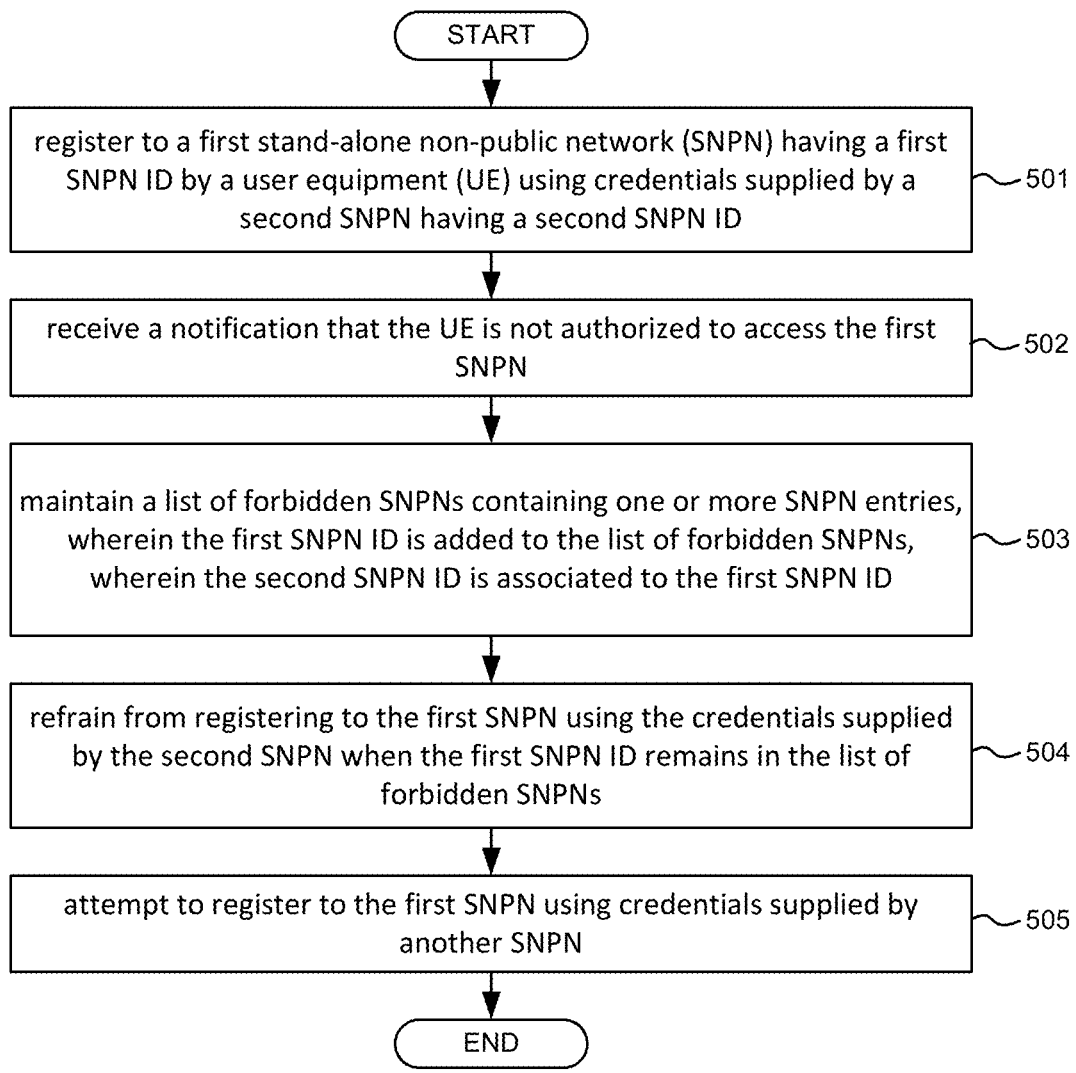
FIG. 5 is a flow chart of a method supporting handling on forbidden SNPN list in accordance with one novel aspect.

FIG. 4 illustrates one example of a list of subscriber data and a permanently or temporarily forbidden SNPN list in accordance with one novel aspect. Under the current 3G PP specification, a UE is configured with a "list of subscriber data" 410 containing zero or more entries. Each entry of the "list of subscriber data" consists of: a) a subscriber identifier in the form of a SUPI (Subscription Permanent Identifier) with the SUPI format "network specific identifier" containing a network-specific identifier; b) credentials; and c) an SNPN identity of the subscribed SNPN. As depicted in FIG. 5, the list of subscriber data contains a plurality of entries: Entry 1 comprises subscriber ID1, credential 1, and SNPN ID 100; Entry 2 comprises subscriber ID2, credential 2, and SNPN ID 300; Entry 3 comprises subscriber ID3, credential 3, and SNPN ID 300; and so on so forth for each subscribed SNPNs.

The UE also maintains a list of "temporarily forbidden SNPNs" for 3GPP access, a list of "permanently forbidden SNPNs" for 3GPP access, a list of "temporarily forbidden SNPNs" for non-3GPP access, and a list of "permanently forbidden SNPNs" for non-3GPP access Each forbidden SNPN list consists of a plurality of entries of an SNPN ID (e.g., the First SNPN ID) that the UE is not authorized to access. The UE adds an SNPN to the list of "temporarily forbidden SNPNs", if a message with cause value #74 "Temporarily not authorized for this SNPN" is received by the UE in response to an request from the SNPN. The UE adds an SNPN to the list of "permanently forbidden SNPNs", if a message with cause value #75 "Permanently not authorized for this SNPN" is received by the UE in response to an request from the SNPN.

In 5GS networks, a UE may support access to an SNPN (the First-SNPN) using credentials from a credential holder (the Second-SNPN). When the UE attempts to access the First-SNPN using credentials supplied by the Second-SNPN, the UE may receive a message with cause value #74 "Temporarily not authorized for this SNPN". Under such scenario, the UE needs to add the First-SNPN ID to the list of "temporarily forbidden SNPNs". In addition, the UE needs to create an association between the First-SNPN and the Second-SNPN. The reason is that the UE is NOT entirely forbidden to access the First-SNPN, e.g., the UE is forbidden to access the First-SNPN using credentials supplied by the Second-SNPN, while the UE is still allowed to access the First-SNPN using credentials supplied by other SNPNs. As a result, the UE needs to know and store the association between the First-SNPN and the Second-SNPN. There are different ways for the UE to create and maintain such association.

In a first embodiment, the list of forbidden SNPNs 420 comprises a plurality of entries, and the First-SNPN ID is added as an entry in the list, along with the Second-SNPN ID (e.g., the Second-SNPN supplies the credentials for access to the First-SNPN). For example, as depicted by THE forbidden list 420, the entry SNPN 101 paired with SNPN 100 indicates that the UE is prohibited to access SNPN 101 (the First-SNPN) using credentials supplied by SNPN 100 (the Second-SNPN), the entry SNPN 102 paired with SNPN 100 indicates that the DE is prohibited to access SNPN 102 (the First-SNPN) using credentials supplied by SNPN 100 (the Second-SNPN), the entry SNPN 201 paired with SNPN 200 indicates that the UE is prohibited to access SNPN 201 (the First-SNPN) using credentials supplied by SNPN 200 (the Second-SNPN), and so on so forth.

In a second embodiment, the list of subscriber data 410 comprises a plurality of entries, and the SNPN ID in each entry represents the Second-SNPN, which is associated to a list of forbidden SNPNs representing the First-SNPNs. For example, entry 1 of the list of subscriber data 410 contains SNPN ID 100, which is associated to a forbidden list 421 having entries of SNPN ID 101 and SNPN ID 102. Such association means that the UE is prohibited to access SNPN 101 (the First-SNPN) using credentials supplied by SNPN 100 (the Second-SNPN), and the UE is also prohibited to access SNPN 102 (the First-SNPN) using credentials supplied by SNPN 100 (the Second-SNPN). Similarly, entry 2 of the list of subscriber data 410 contains SNPN ID 200, which is associated to a forbidden list 422 having entries of SNPN ID 201 and SNPN ID 202. Similarly, entry 3 of the list of subscriber data 410 contains SNPN ID 300, which is associated to a forbidden list 423 having entries of SNPN ID 301 and SNPN ID 302. Such association means that the UE is prohibited to access SNPN 201 (the First-SNPN) using credentials supplied by SNPN 200 (the Second-SNPN), and the UE is also prohibited to access SNPN 202 (the First-SNPN) using credentials supplied by SNPN 200 (the Second-SNPN).

FIG. 5 is a flow chart of a method supporting handling on forbidden SNPN list in accordance with one novel aspect. In step 501, a UE registers to a first stand-alone non-public network (SNPN) having a first SNPN ID using credentials supplied by a second SNPN having a second SNPN ID. In step 502, the UE receives a notification that the UE is not authorized to access the first SNPN. In step 503, the UE maintains a list of forbidden SNPNs containing one or more SNPN entries. The first SNPN ID is added to the list of forbidden SNPNs, and the second SNPN ID is associated to the first SNPN ID. The UE refrains from registering to the first SNPN using the credentials supplied by the second SNPN when the first SNPN ID remains in the list of forbidden SNPNs (step 504). The UE is allowed to attempt to register to the first SNPN using credentials supplied by another SNPN (step 505).

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
registering to a first stand-alone non-public network (SNPN) having a first SNPN ID by a user equipment (UE) using credentials supplied by a second SNPN having a second SNPN ID;
receiving a notification that the UE is not authorized to access the first SNPN; and
maintaining a list of forbidden SNPNs containing one or more SNPN entries, wherein the first SNPN ID is added to the list of forbidden SNPNs, wherein the second SNPN ID is associated to the first SNPN ID, and wherein
the UE refrains from registering to the first SNPN using the credentials supplied by the second SNPN when the first SNPN ID remains in the list of forbidden SNPNs, and
the UE is allowed to attempt to register to the first SNPN using credentials supplied by another SNPN.

2. The method of claim 1, wherein the notification is carried in a registration reject message sent from a network entity.

3. The method of claim 1, wherein the list of forbidden SNPNs is a temporarily or permanently forbidden list via 3GPP access type.

4. The method of claim 1, wherein the list of forbidden SNPNs is a temporarily or permanently forbidden list via non-3GPP access type.

5. The method of claim 1, wherein the UE maintains a list of subscriber data that comprises a plurality of entries, each entry comprises a subscriber ID, a credential, and an SNPN ID of the subscribed SNPN.

6. The method of claim 5, wherein the first SNPN ID in the list of forbidden SNPNs is associated to the second SNPN ID via the entry of the list of subscriber data having the same second SNPN ID.

7. The method of claim 5, wherein each entry of the list of subscriber data is associated to a list of forbidden SNPNs via the SNPN ID of the subscribed SNPN.

8. The method of claim 1, wherein the UE adds the first SNPN ID and the second SNPN ID as an entry in the list of forbidden SNPNs.

9. A User Equipment (UE), comprising:
a registration handling circuit that registers to a first stand-alone non-public network (SNPN) having a first SNPN ID using credentials supplied by a second SNPN having a second SNPN ID;
a receiver that receives a notification that the UE is not authorized to access the first SNPN; and
an SNPN handling circuit that maintains a list of forbidden SNPNs containing one or more SNPN entries, wherein the first SNPN ID is added to the list of forbidden SNPNs, wherein the second SNPN ID is associated to the first SNPN ID, and wherein
the UE refrains from registering to the first SNPN using the credentials supplied by the second SNPN when the first SNPN ID remains in the list of forbidden SNPNs, and
the UE is allowed to attempt to register to the first SNPN using credentials supplied by another SNPN.

10. The UE of claim 9, wherein the notification is carried in a registration reject message sent from a network entity.

11. The UE of claim 9, wherein the list of forbidden SNPNs is a temporarily or permanently forbidden list via 3GPP access type.

12. The UE of claim 9, wherein the list of forbidden SNPNs is a temporarily or permanently forbidden list via non-3GPP access type.

13. The UE of claim 9, wherein the UE maintains a list of subscriber data that comprises a plurality of entries, each entry comprises a subscriber ID, a credential, and an SNPN ID of the subscribed SNPN.

14. The UE of claim 13, wherein the first SNPN ID in the list of forbidden SNPNs is associated to the second SNPN ID via the list of subscriber data having the same second SNPN ID.

15. The UE of claim 13, wherein each entry of the list of subscriber data is associated to a list of forbidden SNPNs via the SNPN ID of the subscribed SNPN.

16. The UE of claim 9, wherein the UE adds the first SNPN ID and the second SNPN ID as an entry in the list of forbidden SNPNs.

* * * * *